Figure 1:
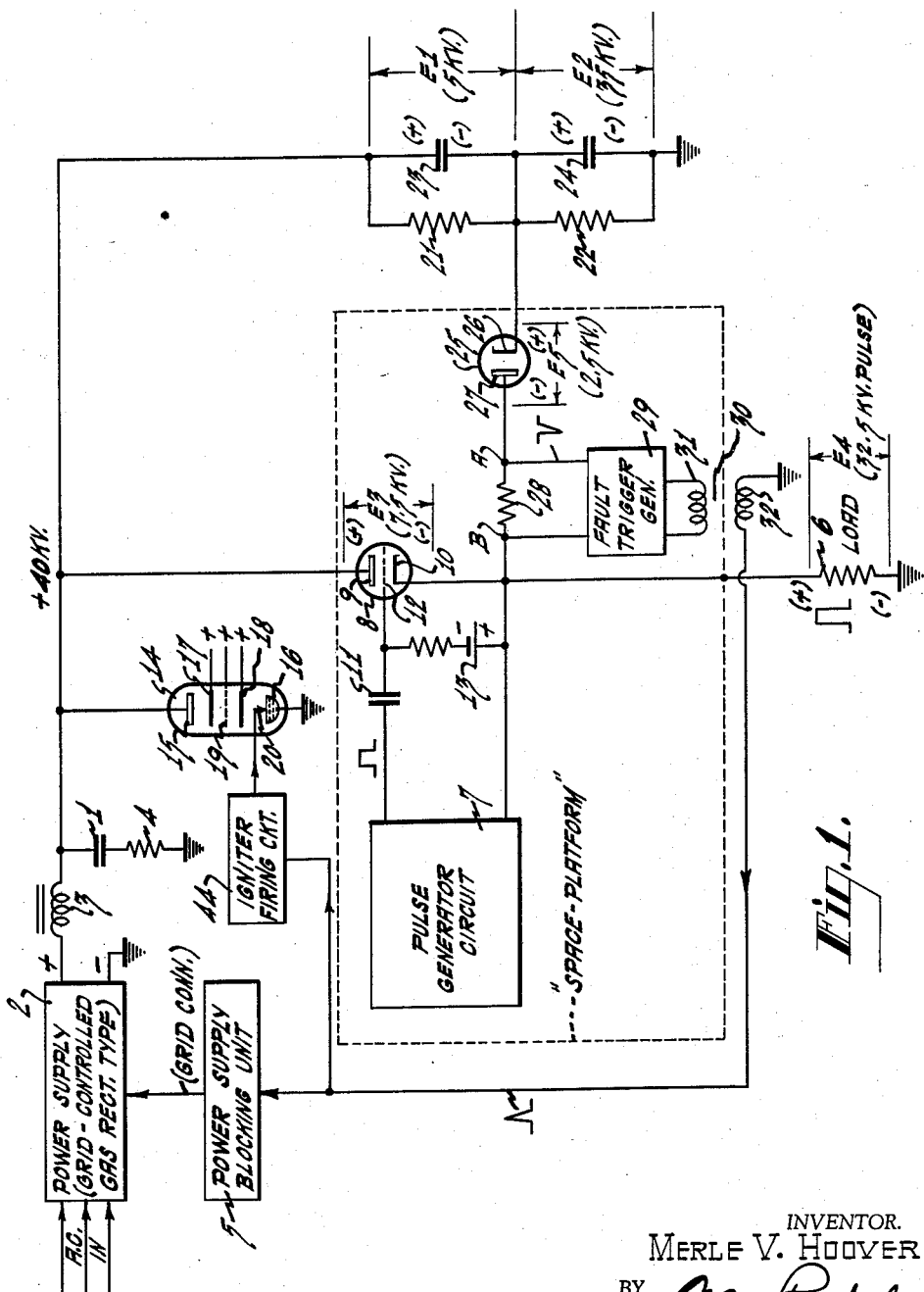

March 8, 1960 M. V. HOOVER 2,928,026
ELECTRON TUBE FAULT DETECTION
Filed March 24, 1958 2 Sheets-Sheet 1

INVENTOR.
MERLE V. HOOVER
BY
ATTORNEY

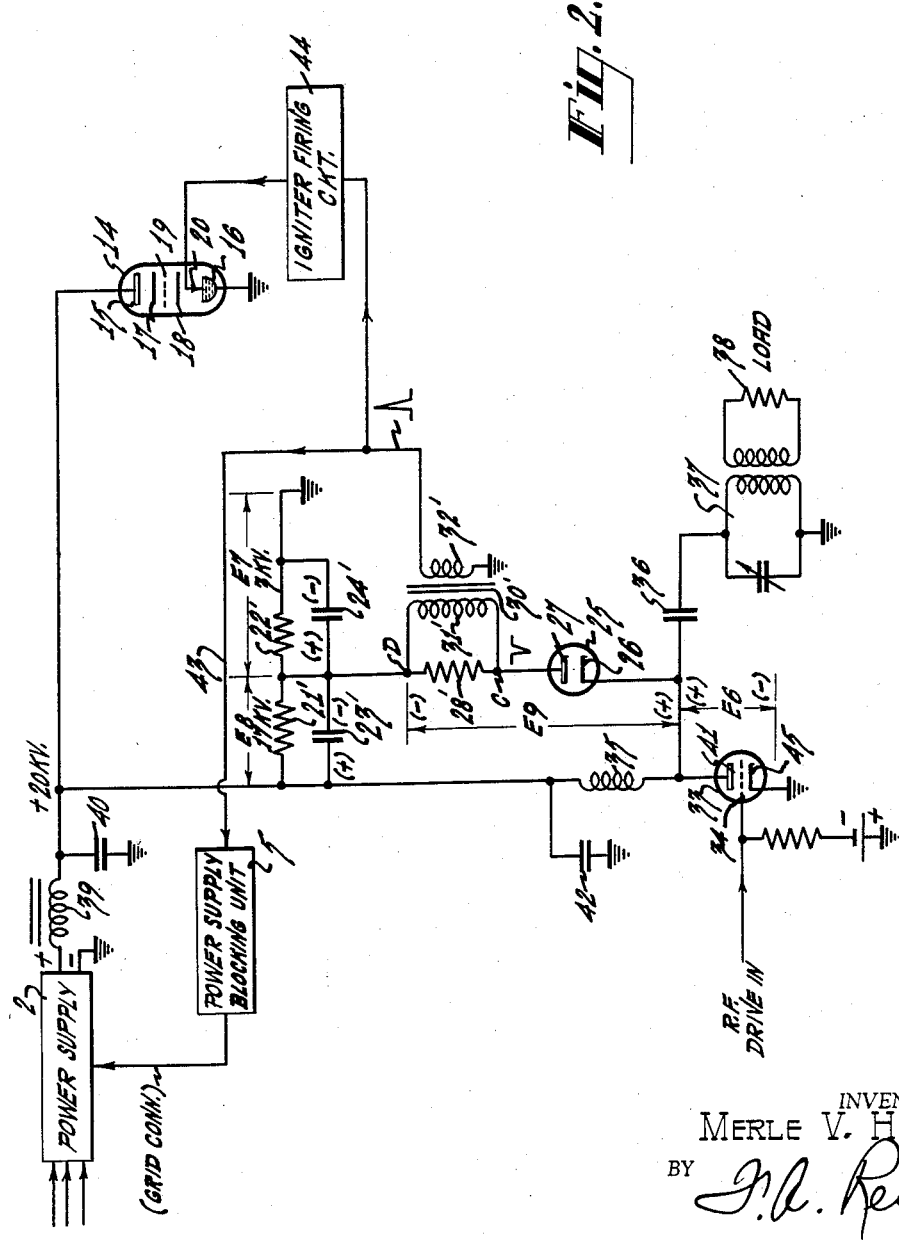

though this discharge path develops a fault-indicating voltage, which is used to trigger the crowbar tube and short-circuit the tube power supply, thus shunting the fault currents through the crowbar tube, and away from the protected tube.

2,928,026
ELECTRON TUBE FAULT DETECTION

Merle V. Hoover, Lancaster, Pa., assignor to Radio Corporation of America, a corporation of Delaware Application March 24, 1958, Serial No. 723,461

6 Claims. (Cl. 315—125)

This invention relates to systems for detecting faults in electron tubes to be protected, particularly in high-power modulator and radio frequency amplifier tubes.

A technique has been evolved for protecting power tubes against faults such as internal flash-arcs. Such a technique comprises detecting the development of fault conditions in a power tube and/or its circuitry and triggering a gas tube connected in shunt with the direct current power supply, thus extinguishing the flash-arc in the power tube before serious damage results. The gas tube bypasses the rectifier output and filter-circuit energy away from the protected (faulting) tube until the rectifier is deenergized. Such an arrangement is known as an "electronic crowbar," and its basic operation is described in a paper entitled "Gas Tubes Protect High-Power Transmitters," Electronics, January 1956, pp. 144–147.

The effectiveness of high-speed fault-protection circuits of any type, including the crowbar type, is quite contingent upon the early detection of a fault in the tube, or in its associated circuitry.

An object of this invention is to provide a novel fault detection circuit, particularly applicable to hard-tube modulators and radio frequency amplifiers.

Another object is to provide a novel high speed fault detecting circuit which is useful as an adjunct to an "electronic crowbar" system.

The objects of this invention are accomplished, briefly, in the following manner: The voltage drop across an operating (protected) tube is continuously monitored, the actual monitoring being done by comparing the voltage at one of the electrodes of the tube with the predetermined potential on a capacitor which is charged from the same power supply used for the tube. During a tube fault such as a flash-arc (or during certain types of circuit faults) the voltage drop across the tube decreases to a low value. This decrease of the voltage drop causes the monitored electrode voltage to approach the capacitor potential, which automatically completes a discharge path for the capacitor. The flow of current through this discharge path develops a fault-indicating voltage, which is used to trigger the crowbar tube and short-circuit the tube power supply, thus shunting the fault currents through the crowbar tube, and away from the protected tube.

A detailed description of the invention follows, taken in conjunction with the accompanying drawings, wherein:

Fig. 1 is a circuit schematic of a fault detecting circuit according to the present invention, used in conjunction with a hard-tube (vacuum tube) modulator; and Fig. 2 is a circuit schematic of a fault detecting circuit of the present invention, used in conjunction with a radio frequency amplifier tube.

Referring first to Fig. 1, this figure is a circuit diagram of the fault detecting circuit of the invention, as applied to a hard-tube (vacuum tube) modulator system. An energy reservoir capacitor 1 is maintained in a charged condition at a potential of 40 kilovolts (kv.) by a rectifier-type power supply 2 which is isolated from capacitor 1 by an inductor 3. One terminal of capacitor 1 is connected to the positive output terminal of the power supply 2 through inductor 3, and the other terminal of this capacitor is connected through a small resistor 4 to ground, the negative output terminal of power supply 2 also being connected to ground.

The power supply 2 may for example be of the grid-controlled gas rectifier types, as disclosed in Parker et al. Patent No. 2,575,232, and in the usual case will include several rectifier tubes operated with polyphase alternating current input voltages. If a grid-controlled rectifier power supply is used, the grids of the rectifier tubes can be blocked in response to the occurrence of a fault. This can be done through the agency of a power supply blocking unit 5 operating on the control grids of the rectifier tubes in the power supply 2, in a manner to be described hereinafter. The output of the blocking unit 5 is coupled to the grid connection of the rectifiers in power supply 2, as indicated in Fig. 1.

The purpose of the vacuum tube modulator circuitry shown in Fig. 1 is the generation of voltage pulses across the load 6, represented by a resistor, in accordance with the output of the pulse generator circuit 7, which actuates the series vacuum tube switch 8, shown as a triode electron discharge device. More specifically, the anode 9 of triode 8 is connected directly to the +40-kv. terminal of capacitor 1, while the cathode 10 of this triode is connected to one end of load resistor 6, the other end of which is grounded, that is, connected to the negative terminal of power supply 2 and the negative terminal of capacitor 1. In practical circuit applications, load 6 could be an amplifier or oscillator tube having a grid, or it could be a klystron, or a magnetron, etc.

Pulse generator circuit 7 operates to produce positive pulses of high voltage amplitude, one of which is illustrated adjacent the high voltage lead of this generator, from lower voltage amplitude drive pulses. The pulse output of pulse generator 7 is fed through a coupling capacitor 11 to grid 12 of vacuum triode 8. Tube 8 is cut off between these pulses by a suitable bias applied to its grid from a battery 13, thus acting between pulses as an open-circuit between load 6 and energy reservoir capacitor 1. The positive voltage pulse output of pulse generator 7, however, causes tube 8 to conduct, so that the series switch 8 then completes the circuit between load 6 and the power supply. Thus, voltage pulses are generated across the load 6 in accordance with the pulse output of the pulse generator 7.

If tube 8 is stricken by an internal flash-arc, it will suffer serious internal damage. Additionally, it is pointed out that in the event of internal flash-arcing in tube 8, an uncontrolled circuit path will be established whereby the capacitor 1 will dump all of its stored energy into the load 6. This stored energy is considerable, since capacitor 1 may have a capacitance of 300 microfarads, and a charged potential of 40 kv. The uncontrolled dumping of energy of this magnitude from capacitor 1 into loads such as a gridded tube, klystron, magnetron, etc., is likely to damage them seriously. Consequently, effective fault detection and protection circuitry must be applied. In the aforementioned Parker patent, an electronic crowbar system is described, in which an ignitron tube (crowbar tube) shunts the fault currents from the faulting load, by short-circuiting the power supply. If such a crowbar system is to be effective, appropriate circuitry must be provided to detect faults as early as possible. The present invention discloses a novel high-speed fault-detecting circuit.

Protection for the tube 8 and the associated circuitry is provided by a normally non-conductive short-circuiting device comprising an ignitron type gas tube 14 shunted across the reservoir capacitor 1 and the power supply 2. The main anode 15 of the ignitron 14 is connected directly to the positive terminal of capacitor 1 and to the lead +40 kv., and the mercury pool cathode 16 is connected to ground, which is the negative power supply terminal. The ignitron dividing anode 17 is connected to a positive potential source of reduced amplitude, this source preferably being provided by the main power supply 2 acting through a voltage divider circuit. The ignitron 14 has an auxiliary anode 18 energized from a suitable positive potential source, and a grid electrode 19 which is supplied with a fixed positive voltage from a suitable source. An igniter electrode 20 is connected to receive firing voltage from the fault detecting circuit, to be described hereinafter.

In accordance with the usual principle of operation of the ignitron type tube, the tube 14 will be non-conductive until a positive voltage is applied to the igniter electrode 20. Thereupon, a small arc will form between the igniter 20 and the cathode pool 16, and this small arc will spread to the anodes 15, 17, 18 substantially instantaneously. Although the ignitron 14 is adapted to withstand very high voltages prior to firing, the voltage drop thereacross after firing is very low, say of the order of 15 or 20 volts. By arranging the ignitron 14 to fire in response to the occurrence of a fault in the tube 8, it can be seen that the ignitron will effectively short-circuit the power supply 2 and the reservoir capacitor 1 if such a fault occurs, thereby diverting the current which otherwise would soon ruin the protected tube 8 and/or the load 6.

The fault-detecting circuit of this invention will now be described. Two resistors 21 and 22 are connected in series between the +40-kv. power supply lead and ground, to form a voltage divider. A capacitor 23 is connected across resistor 21, and a capacitor 24 is connected across resistor 22. The capacitor 23 thus can be charged from the power supply 2 to a predetermined potential which is equal to the voltage drop across resistor 21, and with the polarity indicated. Similarly, the capacitor 24 is charged from the power supply 2 to a predetermined potential equal to the voltage drop across resistor 22, and with the polarity indicated. The ratio of the CR combinations 21, 23 and 22, 24 is made such that an operating voltage of 40 kv., a potential E2 of 35 kv. is continuously provided across 22, 24 and a potential E1 of 5 kv. appears across 21, 23.

During normal operation, the tube 8 is driven (by the pulse output of pulse generator 7) so that its anode-cathode voltage drop E3 is 7.5 kv., the remainder E4 of the 40 kv. (which remainder is 32.5 kv.) appearing across the load 6.

A unilaterally-conducting device 25, for example a vacuum tube diode, has its cathode 26 connected to the junction of resistors 21 and 22 (and of capacitors 23 and 24), and its anode 27 connected through a small resistor 28 to the cathode 10. Under normal circumstances, as described, cathode 10 (and thus also anode 27) is at a potential of +32.5 kv. with respect to ground, while cathode 26 is at a potential of +35 kv. with respect to ground. Under these conditions, there can be no flow of electrons, or of current, through diode 25, since its anode 27 is negative with respect to its cathode 26. The normal difference of potential across diode 25, denoted by E5, is 2.5 kv., with the anode 27 being negative with respect to the cathode 26. The resultant of E1 and E3 is E5, normally 2.5 kv. with the polarity indicated; likewise the resultant of E2 and E4 is E5, normally 2.5 kv. with the polarity indicated.

In the event of an internal flash-arc in tube 8, the anode-cathode voltage E3 will decrease toward zero. When it does so, the potential of cathode 10 (and of diode anode 27) increases from its original value of +32.5 kv. toward +40 kv., while the potential of diode cathode 26 remains at +35 kv. As the potential on anode 27 (the potential of cathode 10 of the protected tube 8) approaches the +35-kv. potential of cathode 26 (which latter is the predetermined potential of capacitor 24), a point is reached where anode 27 is no longer sufficiently negative with respect to cathode 26 to bias diode 25 off, so that this diode then is made conductive to establish a discharge path for the charged capacitors 23 and 24. The charge on capacitor 23 due to E1 (5 kv.) will be able to flow around the discharge path comprising diode 25, resistor 28, and the anode-cathode path of tube 8.

Furthermore, the load voltage E4 will increase toward 40 kv. as E3 approaches zero, in the event of a "perfect fault." Assuming an idealized "perfect fault," E4 would be 40 kv., and its polarity is such with respect to E2 that the resultant voltage E5 during faulting also allows diode 25 to conduct. The charge on capacitor 24 will thus be able to flow around the discharge path comprising diode 25, resistor 28, and load 6 to ground and the other side of capacitor 24.

Both of the above-described circuit perturbations during a fault cause current to flow through resistor 28. In other words, the discharge paths for both capacitors 23 and 24 (which paths are completed in response to the existence of a fault condition in tube 8, due to the changes in voltages E3, E5) include diode 25 and resistor 28. The IR voltage drop across resistor 28, due to the capacitor discharge current flowing through such resistor, is in the form of a trigger pulse with a polarity which is negative at point A (which is the junction of resistor 28 and anode 27) with respect to point B (which is the junction of resistor 28 and cathode 10). The waveform of this voltage may then be as illustrated by the narrow negative pulse adjacent point A. This pulse of voltage across resistor 28 is applied to a fault trigger generator 29 to fire the crowbar tube 14 via an isolation transformer 30. The fault trigger generator 29 may comprise an ordinary thyratron (gas tube) which is fired by the voltage pulse across resistor 28, thereby producing a voltage pulse in the primary winding 31 of transformer 30.

The pulse in the primary winding 31 of transformer 30 induces a pulse in the secondary winding 32 of this same transformer, in response to a fault condition in tube 8. One end of winding 32 is grounded, and the opposite end is connected through an igniter firing circuit 44 to igniter electrode 20 of ignitron 14. Firing circuit 44 may be similar to the "direct current amplifier and pulse generator" unit disclosed in the aforementioned Parker patent. The windings 31 and 32 are so related that a pulse that is positive with respect to ground is applied by firing circuit 44 to igniter electrode 20, upon the occurrence of a fault in the protected tube 8. A pulse of this type is illustrated adjacent the lead between winding 32 and circuit 44. When this positive pulse is applied to igniter 20, an arc will be struck between the igniter electrode 20 and the cathode pool 16 in the ignitron 14, firing the ignitron 14 and short-circuiting the power supply 2. This short-circuiting of the power supply shunts away fault currents from the faulting tube 8.

In view of the above, it may be stated that the trigger pulse developed across resistor 28 during a fault activates the fault trigger generator 29 to provide a signal to fire the crowbar tube 14 via the isolation transformer 30.

The cathode 10 of the protected tube 8, it will be remembered, normally operates above ground, at a potential of 32.5 kv. with respect to ground. This cathode is electrically connected to the "space-platform," which is indicated by the dotted-line enclosure surrounding the pulse generator circuit 7, tube 8, diode 25, fault trigger generator 29, etc. The "space-platform" can be a metal platform insulated above ground, on which are mounted the various components which operate above ground potential. The transformer 30 is insulated for high voltage (primary to secondary), since its primary 31 operates at a substantial potential above ground, and its secondary 32 operates at ground. This transformer is also designed for low capacitance between its primary and secondary windings. All of the circuitry on the "space-platform" must have low capacitance with respect to ground, in order to avoid adverse effects on the rise and fall times of the pulses appearing across the load 6, that is, to avoid adverse effects on the system frequency response.

Although the ignitron tube 14, when the same is fired, will serve to protect the electron tube 8 against serious damage, it is evident that the ignitron 14 will draw a relatively large current from the power supply 2, or from the reservoir capacitor 1. While this heavy current drain would eventually cause operation of the circuit breaker normally provided in power supply 2, more effective power supply protection can be obtained by blocking the grids of the rectifier tubes in the power supply, if grid-controlled rectifier tubes are used therein. This can be done by applying the positive pulse appearing in winding 32 to a power supply blocking unit 5, which may be arranged as disclosed in the aforementioned Parker patent. The unit 5 can be connected to negatively bias the control grids of the rectifier tubes in the power supply 2 when a fault occurs in tube 8, which latter results in a positive pulse appearing in winding 32 and being applied to the blocking unit 5. Thus, further conduction in the rectifier of the power supply 2 is prevented, when a fault occurs in protected tube 8. Therefore, the positive pulse appearing in winding 32 (in response to a fault in tube 8) fires the ignitron 14, and also deenergizes or turns off the rectifier in power supply 2.

The following values for certain of the circuit components in Fig. 1 are given by way of example. These are the values used in a circuit according to Fig. 1 which was built and successfully tested.

| | |
|---|---|
| Tube 14 | Type GL 5630. |
| Tube 8 | Type RCA 6949. |
| Tube 25 | Type RCA 8013A. |
| Resistor 4 | 4 ohms. |
| Resistor 21 | 5 megohms. |
| Resistor 22 | 35 megohms. |
| Resistor 28 | 50 ohms. |
| Inductor 3 | 0.5 henry. |
| Capacitor 1 | 300 mfd. |
| Capacitor 23 | 0.01 mfd. |
| Capacitor 24 | 0.0015 mfd. |

Fig. 2 illustrates a fault detecting circuit according to the present invention, used in conjunction with a radio frequency amplifier tube. In this figure, tube 33 is a radio frequency amplifier tube driven by a suitable drive voltage applied to its grid 34. This tube operates in a shunt-fed system comprising the shunt-feed choke 35, coupling capacitor 36, tank circuit 37, and a dummy load 38. Direct current power is supplied from a power supply 2 via a filter network 39, 40. Capacitor 42 is a radio frequency bypass capacitor.

As in Fig. 1, a resistor voltage divider network, comprising two series-connected resistors 21', 22', is connected across the power supply output. A capacitor is connected across each of these resistors, to be charged to the voltage thereacross. Capacitor 23' is connected across resistor 21', while capacitor 24' is connected across resistor 22'. The values of 22', 24' and 21', 23' are chosen to have a ratio such that in normal operation, at an anode supply voltage of 20 kv., there will be developed across 22', 24' a potential E7 of 3 kv., and across 21', 23' there will appear the remainder (E8), which is 17 kv.

The junction of resistors 21' and 22' (and also of capacitors 23' and 24') is connected through a small resistor 28' to the anode 27 of diode 25, while the cathode 26 of diode 25 is connected to the anode 41 of amplifier tube 33. The cathode 45 of tube 33 is grounded, as is the negative output terminal of power supply 2.

For normal operation, a typical condition will be described, in which the instantaneous anode-cathode voltage E6 across tube 33 varies sinusoidally, as tube 33 is driven. This voltage would of course vary about the anode supply voltage of +20 kv., and for the minimum anode voltage (bottom of the sinusoidal waveform at anode 41), a value of +5 kv. (with respect to ground) would be typical. Consequently, in normal operation the minimum value of E6 with respect to ground would be +5 kv., this voltage with respect to ground also being effective at the cathode 26 of diode 25. It should be understood that E7 (3 kv.) is the potential between the anode 27 of tube 25 and ground, since anode 27 is connected through resistor 28' to the ungrounded side of capacitor 24', across which there is a potential E7 of 3 kv. during normal operation. Thus, the polarities and magnitudes of E6 and E7 are such that the voltage E9 across diode 25 has a minimum value (at the bottom of the sinusoidal waveform at anode 41) of 2 kv., with the potential of anode 27 being +3 kv. with respect to ground and the potential of cathode 26 being +5 kv. with respect to ground, at the minimum. Thus, at the minimum anode potential point for tube 33, the cathode 26 is sufficiently positive with respect to anode 27 that current will not then flow through tube 25, under normal circumstances.

At the maximum anode potential point for tube 33 (corresponding to the top or peak of the sinusoidal waveform at anode 41), the voltage at anode 41 (also effective on cathode 26) may be on the order of +35 kv. with respect to ground. The voltage E9 thus has a maximum value of 32 kv., the cathode 26 then being very highly positive with respect to anode 27. Therefore, the cathode 26 is sufficiently positive with respect to anode 27, throughout the entire alternating current cycle at anode 41, that current will never flow through tube 25, under normal operation.

In the event of an internal flash-arc in tube 33, potential E6 will approach zero as a "perfect fault" develops. Since E7 (the voltage of +3 kv. effective on anode 27) is now greater than E6 (the voltage on cathode 26, approaching zero), diode 25 can conduct (it no longer being biased off), establishing a discharge path for capacitor 24'. This discharge path is set up as the potential on the anode 41 of the protected tube 33 approaches the predetermined potential of capacitor 24'. The discharge path for capacitor 24' being established, there will be a flow of charged energy from capacitor 24' to ground, via resistor 28', diode 25, and tube 33. This flow of current, supplied by capacitor 24', will produce an IR voltage drop across resistor 28' in the form of a pulse, just as in Fig. 1. The direction of the flow of current through resistor 28' is such that point C is negative with respect to point D.

The primary winding 31' of an isolation transformer 30' is connected across resistor 28'. One end of the secondary winding 32' of this transformer is grounded, and the other end of such winding is connected through an igniter firing circuit 44 to the igniter electrode 20 of the ignitron 14, as in Fig. 1. The ungrounded end of winding 32' is also coupled to an arrangement, such as a power supply blocking unit 5, for blocking or deenergizing the rectifier of the power supply 2, as indicated by the connection labeled 43.

The pulse produced across resistor 28', in response to the occurrence of a fault in the protected tube 33, appears as a positive pulse at the ungrounded end of winding 32' of the isolation transformer 30'. Thus, in the same manner as in Fig. 1, the pulse produced across resistor 28' is coupled via transformer 30' and circuit 44 to the igniter electrode 20 of the crowbar tube 14, firing this tube to short-circuit the power supply 2 and shunt the fault currents away from the faulting tube 33.

Also, the pulse appearing at transformer winding 32' in response to the occurrence of a fault is applied by way of connection 43 to the blocking unit 5, which operates in response to such pulse to deenergize or block the rectifiers in power supply 2, just as in Fig. 1.

The following values for some of the components in Fig. 2 are given by way of example. These values are typical for an operative arrangement.

| | |
|---|---|
| Tube 33 | Type RCA 6949. |
| Resistor 21' | 17 megohms. |
| Resistor 22' | 3 megohms. |
| Resistor 28' | 50 ohms. |

What is claimed is:

1. A fault-detecting circuit for an electron tube supplied with unidirectional operating voltage from a power supply, said circuit comprising a capacitor connected to be charged from said power supply to a predetermined potential, a controllable discharge path for said capacitor including a unilaterally-conducting device, said device being coupled to one electrode of said tube, said predetermined potential and the voltage at said one tube electrode being such as to constrain said device to conduct only when said one electrode voltage approaches said predetermined potential; and means for developing a fault-indicating voltage in response to the flow of current from said capacitor through said device.

2. A system for protecting an electron tube supplied with unidirectional operating voltage from a power supply, said system comprising a capacitor connected to be charged from said power supply to a predetermined potential, a controllable discharge path for said capacitor including a unilaterally-conducting device, said device being coupled to one electrode of said tube, said predetermined potential and the voltage at said one tube electrode being such as to constrain said device to conduct only when said one electrode voltage approaches said predetermined potential; means for developing a fault-indicating voltage in response to the flow of current from said capacitor through said device, and means responsive to said fault-indicating voltage for short-circuiting said power supply.

3. A system for protecting an electron tube supplied with unidirectional operating voltage from a power supply, said system comprising a normally non-conductive gaseous discharge device shunting said power supply to short-circuit the same in response to a voltage of predetermined magnitude applied to a firing control electrode of said device, a capacitor connected to be charged from said power supply to a predetermined potential, a controllable discharge path for said capacitor including a unilaterally-conducting device, said last-named device being coupled to one electrode of said tube, said predetermined potential and the voltage at said one tube electrode being such as to constrain said last-named device to conduct only when said one electrode voltage approaches said predetermined potential; means for developing a fault-indicating voltage in response to the flow of current from said capacitor through said last-named device, and means for applying said fault-indicating voltage to the firing control electrode of said gaseous device to fire said gaseous device.

4. A fault-detecting circuit for an electron tube supplied with unidirectional operating voltage from a power supply, said circuit comprising a capacitor connected to be charged from said power supply to a predetermined potential, a diode, a connection from one of the electrodes of said diode to said capacitor, a connection from one of the electrodes of said tube to the other electrode of said diode, the potential at said one tube electrode having a certain value during normal operation of said tube and being so related to said predetermined potential that said diode does not conduct during normal operation of said tube, and means for developing a fault-indicating voltage in response to the flow of current from said capacitor through said diode, when said diode is caused to conduct.

5. A system for protecting an electron tube supplied with unidirectional operating voltage from a power supply, said system comprising a capacitor connected to be charged from said power supply to a predetermined potential, a diode, a connection from one of the electrodes of said diode to said capacitor, a connection from one of the electrodes of said tube to the other electrode of said diode, the potential at said one tube electrode having a certain value during normal operation of said tube and being so related to said predetermined potential that said diode does not conduct during normal operation of said tube, means for developing a fault-indicating voltage in response to the flow of current from said capacitor through said diode, when said diode is caused to conduct, and means responsive to said fault-indicating voltage for short-circuiting said power supply.

6. A system for protecting an electron tube supplied with unidirectional operating voltage from a power supply, said system comprising a normally non-conductive gaseous discharge device shunting said power supply to short-circuit the same in response to a voltage of predetermined magnitude applied to a firing control electrode of said device, a capacitor connected to be charged from said power supply to a predetermined potential, a diode, a connection from one of the electrodes of said diode to said capacitor, a connection from one of the electrodes of said tube to the other electrode of said diode, the potential at said one tube electrode having a certain value during normal operation of said tube and being so related to said predetermined potential that said diode does not conduct during normal operation of said tube, means for developing a fault-indicating voltage in response to the flow of current from said capacitor through said diode, when said diode is caused to conduct, and means for applying said fault-indicating voltage to the firing control electrode of said device to fire said device.

References Cited in the file of this patent

UNITED STATES PATENTS 2,575,232    Parker et al. _____ Nov. 13, 1951

OTHER REFERENCES

"Gas Tubes Protect High Power Transmitters," Parker and Hoover, Electronics, January 1956, pages 144 to 147.